(12) United States Patent
Eichhorn

(10) Patent No.: US 6,962,611 B2
(45) Date of Patent: Nov. 8, 2005

(54) DYE MIXTURES OF FIBER-REACTIVE AZODYES AND USE THEREOF

(75) Inventor: Joachim Eichhorn, Frankfurt (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 116 days.

(21) Appl. No.: 10/478,124

(22) PCT Filed: May 28, 2002

(86) PCT No.: PCT/EP02/05824
§ 371 (c)(1),
(2), (4) Date: Nov. 20, 2003

(87) PCT Pub. No.: WO02/098986
PCT Pub. Date: Dec. 12, 2002

(65) Prior Publication Data
US 2004/0139567 A1 Jul. 22, 2004

(30) Foreign Application Priority Data
Jun. 2, 2001 (DE) .......................... 101 27 061

(51) Int. Cl.$^7$ .......................... C09B 67/24; D06P 1/384
(52) U.S. Cl. .................. 8/549; 8/543; 8/641
(58) Field of Search .................. 8/641, 549, 543

(56) References Cited

U.S. PATENT DOCUMENTS

| | | | |
|---|---|---|---|
| 5,611,821 A | * 3/1997 | Huang et al. | 8/549 |
| 6,159,251 A | * 12/2000 | Pedemonte et al. | 8/639 |
| 6,281,340 B1 | 8/2001 | Eichhorn | |
| 6,368,362 B1 | 4/2002 | Pedemonte et al. | |

FOREIGN PATENT DOCUMENTS

| EP | 0 976 792 | 2/2000 |
|---|---|---|
| EP | 0 982 374 | 3/2000 |
| EP | 1 046 677 | 10/2000 |
| EP | 1 046 679 | 10/2000 |
| EP | 1 048 695 | 11/2000 |

* cited by examiner

Primary Examiner—Margaret Einsmann
(74) Attorney, Agent, or Firm—Connolly Bove Lodge & Hutz

(57) ABSTRACT

Reactive dye mixtures containing one or more dyes of the hereinbelow indicated and defined general formula (I)

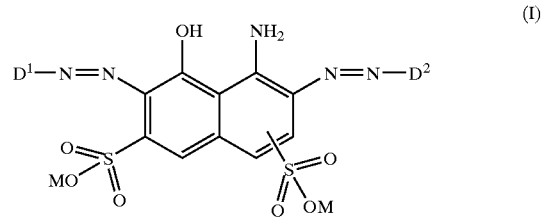

and one or more dyes of the hereinbelow indicated and defined general formula (II)

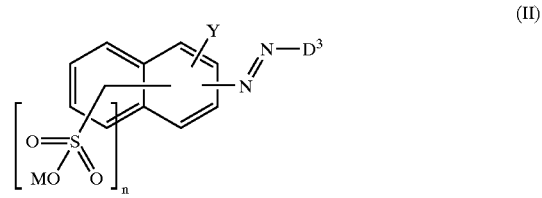

where
$D^1$ to $D^3$, M, n and Y are each as defined in claim 1, are prepared and used for dyeing hydroxyl- and carboxamido-containing material.

18 Claims, No Drawings

DYE MIXTURES OF FIBER-REACTIVE AZODYES AND USE THEREOF

This invention relates to the technical field of fiber-reactive azo dyes.

Mixed fiber-reactive azo dyes and their use for dyeing hydroxyl- and carboxamido-containing material in black shades are known for example from the documents U.S. Pat. Nos. 5,445,654, 5,611,821, KR 94-2560, Sho 58-160362 and EP-A-0 870 807.

However, they have certain application defects, such as for example an overly large dependence of the color yield on varying dyeing parameters in the dyeing process or an insufficient or unlevel color build-up on cotton (good color build-up results from the ability of a dye to provide a proportionally stronger dyeing when used in higher concentrations in the dyebath), or an excessive salt dependence of the dyeings. Consequences of these defects can be poor reproducibilities for the dyeings that are obtainable. The documents WO 98/42784, WO 98/42785, WO 93/18224 and U.S. Pat. No. 5,330,539 disclose dyes and dye mixtures which can be dyed in the presence of small amounts of salt, but which provide only very weak dyeings in the absence of salt.

Since it is commercially as well as environmentally necessary to reduce the salt content of dyeing effluent, there is a need for reactive dyes which provide dyeings of high color strength in the presence of small amounts of salt or even in the absence of electrolyte salts.

The present invention, then, provides dye mixtures which provide dyeings of high color strength in the presence of only very low levels or even in the absence of electrolyte salts.

The invention accordingly provides dye mixtures comprising one or more, such as two or three, preferably 1 or 2, dyes of the hereinbelow indicated and defined general formula (I)

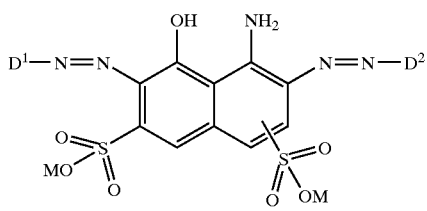

(I)

and one or more, such as two or three, preferably 1 or 2, dyes of the hereinbelow indicated and defined general formula (II)

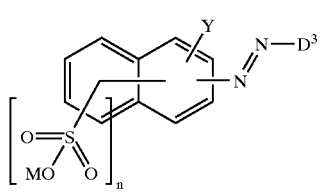

(II)

where:

$D^1$ and $D^2$ are each a group of the general formula (1)

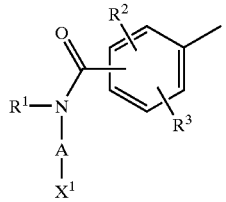

(1)

where $R^1$ is hydrogen, $(C_1-C_4)$-alkyl, aryl or a substituted aryl radical;

$R^2$ and $R^3$ are independently hydrogen, $(C_1-C_4)$-alkyl, $(C_1-C_4)$-alkoxy, hydroxyl, sulfo, carboxyl, amido or halogen; and A is a phenylene group of the general formula (2)

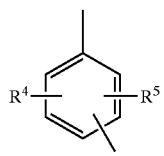

(2)

where $R^4$ and $R^5$ are independently hydrogen, $(C_1-C_4)$-alkyl, $(C_1-C_4)$-alkoxy, hydroxyl, sulfo, carboxyl, amido or halogen; or a naphthylene group of the general formula (3)

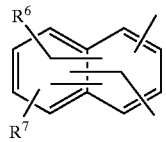

(3)

where $R^6$ and $R^7$ are independently hydrogen, $(C_1-C_4)$-alkyl, $(C_1-C_4)$-alkoxy, hydroxyl, sulfo, carboxyl, amido or halogen; or a polymethylene group of the general formula (4)

$$—(CR^8R^9)_k—$$ (4)

where k is an integer greater than 1 and $R^8$ and $R^9$ are independently hydrogen, $(C_1-C_4)$-alkyl, $(C_1-C_4)$-alkoxy, hydroxyl, cyano, amido, halogen or aryl; and $X^1$ is hydrogen or a group of the formula $—SO_2—Z$; or are each a phenyl group of the general formula (5)

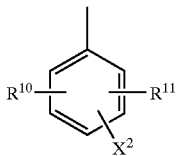
(5)

where
  $R^{10}$ and $R^{11}$ are independently hydrogen, $(C_1-C_4)$-alkyl, $(C_1-C_4)$-alkoxy, hydroxyl, sulfo, carboxyl, amido or halogen; and
  $X^2$ has one of the meanings of $X^1$;
or are each a naphthyl group of the general formula (6)

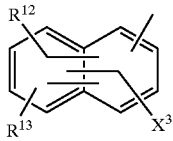
(6)

where
  $R^{12}$ and $R^{13}$ are independently hydrogen, $(C_1-C_4)$-alkyl, $(C_1-C_4)$-alkoxy, hydroxyl, sulfo, carboxyl, amido or halogen; and
  $X^3$ has one of the meanings of X;
Z is —CH=CH$_2$, —CH$_2$CH$_2$Z$^1$ or hydroxyl,
  where
    $Z^1$ is hydroxyl or an alkali-eliminable group; and
M is hydrogen, an alkali metal or one equivalent of an alkaline earth metal;
$D^3$ has one of the meanings of $D^1$ or $D^2$ or is a group of the general formula (7)

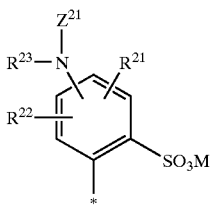
(7)

where
  $R^{21}$ and $R^{22}$ independently have one of the meanings of $R^2$ and $R^3$;
  $R^{23}$ is hydrogen, $(C_1-C_4)$-alkyl, unsubstituted or $(C_1-C_4)$-alkyl-, $(C_1-C_4)$-alkoxy-, sulfo-, halogen- or carboxyl-substituted phenyl; and
  $Z^{21}$ is a fiber-reactive group of the general formula (8) or (9) or (10)

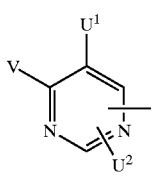
(8)

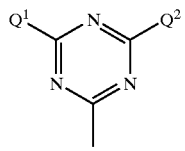
(9)

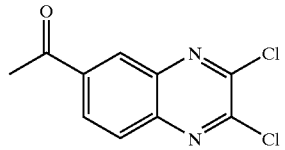
(10)

where
  V is fluorine or chlorine;
  $U^1$ and $U^2$ are independently fluorine, chlorine or hydrogen; and
  $Q^1$ and $Q^2$ are independently chlorine, fluorine, cyanamide, hydroxyl, $(C_1-C_6)$-alkoxy, phenoxy, sulfophenoxy, mercapto, $(C_1-C_6)$-alkylmercapto, pyridino, carboxypyridino, carbamoylpyridino or a group of the general formula (11) or (12)

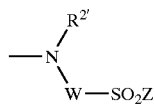
(11)

(12)

where
  $R^{2'}$ is hydrogen or $(C_1-C_6)$-alkyl, sulfo-$(C_1-C_6)$-alkyl, or phenyl which is unsubstituted or substituted by $(C_1-C_4)$-alkyl, $(C_1-C_4)$-alkoxy, sulfo, halogen, carboxyl, acetamido or ureido;
  $R^{3'}$ and $R^{4'}$ independently have one of the meanings of $R^{2'}$, or combine to form a cyclic ring system of the formula —(CH$_2$)$_j$—, where j is 4 or 5, or alternatively —(CH$_2$)$_2$—E—(CH$_2$)$_2$—, where E is oxygen, sulfur, sulfo, —NR$^{5'}$—, where $R^{5'}$ is equal to $(C_1-C_6)$-alkyl, or is a group of the general formula (13)

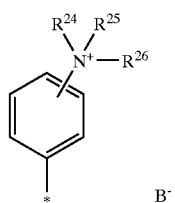
(13)

where
  $R^{24}$, $R^{25}$ and $R^{26}$ are each $(C_1-C_4)$-alkyl or $(C_1-C_4)$-hydroxyalkyl; and
  B— is the equivalent of an anion, such as hydrogensulfate, sulfate, fluoride, chloride, bromide, dihydrogenphosphate, hydrogenphosphate, phosphate, hydroxide or acetate;
  W is phenylene which is unsubstituted or substituted by 1 or 2 substituents, such as $(C_1-C_4)$-alkyl, $(C_1-C_4)$- alkoxy, carboxyl, sulfo, chlorine, bromine, or is $(C_1-C_4)$-alkylene-arylene or $(C_2-C_6)$-alkylene, which can be interrupted by oxygen, sulfur, sulfo, amino, carbonyl, carboxamido, or is phenylene-CONH-phenylene, which is unsubstituted or substituted by $(C_1-C_4)$-alkyl, $(C_1-C_4)$-alkoxy, hydroxyl, sulfo, carboxyl, amido, ureido or halogen, or is naphthylene, which is unsubstituted or substituted by one or two sulfo groups; and Z is as defined above;

n is 1 or 2; and

Y is hydroxyl or amino which is unsubstituted or substituted by $(C_1-C_4)$-alkyl or aryl;

at least one of $D^1$ and $D^2$ is a group of the general formula (1);

when A is a group of the general formula (4), $R^1$ is aryl or substituted aryl; and the reactive dye of the general formula (I) contains at least one $-SO_2-Z$ group.

The individual symbols in the general formulae above and below can have identical or different meanings under their definition, irrespective of whether the symbols bear the same or a different designation.

$(C_1-C_4)$-Alkyl R may be straight-chain or branched and is in particular methyl, ethyl, n-propyl, isopropyol, n-butyl, isobutyl, sec-butyl or tert-butyl. Methyl and ethyl are preferred. The same logic applies to $(C_1-C_4)$-alkoxy groups.

Aryl R is in particular phenyl. Substituted aryl $R^1$ is in particular phenyl substituted by one, two or three independent groups selected from the group consisting of $(C_1-C_4)$-alkyl, $(C_1-C_4)$-alkoxy, hydroxyl, sulfo, carboxyl, amido and halogen.

Halogen R is in particular fluorine, chlorine or bromine, and chlorine and bromine are preferred.

Alkali-eliminable $Z^1$ in the β-position of the ethyl group of Z include for example halogen atoms, such as chlorine and bromine, ester groups of organic carboxylic and sulfonic acids, as of alkylcarboxylic acids, substituted or unsubstituted benzenecarboxylic acids and substituted or unsubstituted benzenesulfonic acids, such as alkanoyloxy of 2 to 5 carbon atoms, especially acetyloxy, benzoyloxy, sulfobenzoyloxy, phenylsulfonyloxy and toluylsulfonyloxy, also acidic ester groups of inorganic acids, as of phosphoric acid, sulfuric acid and thiosulfuric acid (phosphato, sulfato and thiosulfato groups), similarly dialkylamino groups having alkyl groups of 1 to 4 carbon atoms in each case, such as dimethylamino and diethylamino.

Z is preferably vinyl, β-chloroethyl and particularly preferably β-sulfatoethyl.

The groups "sulfo", "carboxyl", "thiosulfato", "phosphato" and "sulfato" include not only their acid form but also their salt form. Accordingly, sulfo groups are groups conforming to the general formula $-SO_3M$, thiosulfato groups are groups conforming to the general formula $-S-SO_3M$, carboxyl groups are groups conforming to the general formula $-COOM$, phosphato groups are groups conforming to the general formula $-OPO_3M_2$ and sulfato groups are groups conforming to the general formula $-OSO_3M$, in each of which M is as defined above.

The dyes of the general formula (I) and (II) may possess different fiber-reactive groups $-SO_2Z$ within the meaning of Z. More particularly, the fiber-reactive groups $-SO_2Z$ may be on the one hand vinylsulfonyl groups and on the other $-CH_2CH_2Z^1$ groups, preferably β-sulfatoethylsulfonyl groups. If the dyes of the general formula (I) and (II) contain vinylsulfonyl groups in some instances, then the fraction of the respective dye with the vinylsulfonyl group is up to about 30 mol %, based on the respective amount of total dye.

Alkali M is in particular lithium, sodium or potassium. M is preferably hydrogen or sodium.

k is preferably 2 or 3.

$R^1$ to $R^{13}$ are each preferably hydrogen and $R^6$, $R^7$, $R^{12}$ and $R^{13}$ are each preferably sulfo as well.

When A is phenylene and X is $-SO_2Z$, the $SO_2Z$ group is preferably disposed meta or para relative to the nitrogen atom. In the group of the general formula (1), the carboxamide group is preferably disposed para or meta relative to the diazo group. When A is naphthylene, the bond leading to the nitrogen atom is preferably attached to the naphthalene nucleus in the β-position. When $D^1$ or $D^2$ is a group of the general formula (6), then the bond which leads to the diazo group is preferably attached to the naphthalene nucleus in the β-position.

When $D^1$ or $D^2$ is a group of the general formula (5) and $X^2$ is $-SO_2Z$, then the $SO_2Z$ group is preferably disposed meta or para relative to the diazo group.

Examples of substituents A are in particular 1,2-phenylene, 1,3-phenylene, 1,4-phenylene, 2-chloro-1,4-phenylene, 2-chloro-1,5-phenylene, 2-bromo-1,4-phenylene, 2-sulfo-1,4-phenylene, 2-sulfo-1,5-phenylene, 2-methoxy-1,5-phenylene, 2-ethoxy-1,5-phenylene, 2,5-dimethoxy-1,4-phenylene, 2-methoxy-5-methyl-1,4-phenylene, 2-methyl-1,4-phenylene, 2,6-naphthylene, 2,8-naphthylene, 1-sulfo-2,6-naphthylene, 6-sulfo-2,8-naphthylene or 1,2-ethylene and 1,3-propylene.

A is particularly preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene or 1,2-ethylene and 1,3-propylene, and in the case of the two last-mentioned alkylene groups $R^1$ is preferably phenyl or 2-sulfophenyl.

Examples of groups $D^1$ and $D^2$ of the general formulae (5) and (6) are 2-(β-sulfato-ethylsulfonyl)-phenyl, 3-(β-sulfatoethylsulfonyl)-phenyl, 4-(β-sulfatoethylsulfonyl)-phenyl, 2-carboxy-5-(β-sulfatoethylsulfonyl)-phenyl, 2-chloro-4-(β-sulfatoethyl-sulfonyl)-phenyl, 2-chloro-5-(β-sulfatoethylsulfonyl)-phenyl, 2-bromo-4-(β-sulfato-ethylsulfonyl)-phenyl, 2-sulfo-4-(β-sulfatoethylsulfonyl)-phenyl, 2-sulfo-5-(β-sulfato-ethylsulfonyl)-phenyl, 2-methoxy-5-(β-sulfatoethylsulfonyl)-phenyl, 2-ethoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 2-methyl-4-(β-sulfatoethylsulfonyl)-phenyl, 2- or 3- or 4-(β-thiosulfatoethylsulfonyl)-phenyl, 2-methoxy-5-(β-thiosulfatoethylsulfonyl)-phenyl, 2-sulfo-4-(β-phosphatoethylsulfonyl)-phenyl, 2-or 3- or 4-vinylsulfonyl-phenyl, 2-sulfo-4-vinylsulfonyl-phenyl, 2-chloro-4-(β-chloro-ethylsulfonyl)-phenyl, 2-chloro-5-(β-chloroethylsulfonyl)-phenyl, 3- or 4-(β-acetoxyethylsulfonyl)-phenyl, 6- or 8-(β-sulfatoethylsulfonyl)-naphth-2-yl, 6-(β-sulfatoethylsulfonyl)-1-sulfo-naphth-2-yl and 8-(β-sulfatoethylsulfonyl)-6-sulfo-naphth-2-yl, preferably 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl and 3- or 4-vinylsulfonyl-phenyl.

In the general formula (II), Y is preferably hydroxy or amino.

$D^3$ is preferably 3-(β-sulfatoethylsulfonyl)-phenyl, 4-(β-sulfatoethylsulfonyl)-phenyl, 2-sulfo-4-(β- sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-5-methyl-4-(β-sulfato-ethylsulfonyl)-phenyl, 6-(β-sulfatoethylsulfonyl)-1-sulfonaphth-2-yl, 3- or 4-vinylsulfonyl-phenyl, 1-sulfo-4-(2,4-difluoro-pyrimidin-6-yl)-amino-2-phenyl or 1-sulfo-4-(4,6-difluoro-pyrimidin-2-yl)-amino-2-phenyl, or a group of the general formula (1), where A, $R^1$ to $R^3$ and $X^1$ each have the preferred meanings described above.

In the general formula (7), $R^{21}$ to $R^{23}$ are each preferably hydrogen and $R^{21}$ and $R^{22}$ are preferably sulfo as well.

In the general formulae (11) and (12), $R^{2'}$ to $R^{4'}$ are each preferably hydrogen or methyl, $R^{2'}$ is preferably phenyl as well and $R^{3'}$ and $R^{4'}$ are each preferably 2-sulfoethyl, 2-, 3- or 4-sulfophenyl, 3- or 4-trimethylammoniophenyl sulfate, 3- or 4-trimethylammoniophenyl chloride, or $R^{3'}$ and $R^{4'}$ combine to form a cyclic ring system which preferably conforms to the formula —(CH$_2$)$_2$—O—(CH$_2$)$_2$—.

W is preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene, 1,2-ethylene, 1,3-propylene.

$Q^1$ and $Q^2$ are independently preferably fluorine, chlorine, carboxypyridino, carbamoylpyridino or a group of the general formula (11) or (12), where $R^{2'}$ to $R^{4'}$, W and Z each have the abovementioned preferred meanings.

In the general formula (13), $R^{24}$ to $R^{26}$ are each preferably methyl or ethyl. Anion B$^-$ is preferably sulfate or chloride. In the general formula (13), the quaternary ammonium group is preferably meta or para to the free bond.

Examples of the group $Z^{21}$ are 2,4-dichloro-1,3,5-triazin-6-yl, 2-chloro-4-hydroxy-1,3,5-triazin-6-yl, 2-chloro-4-methoxy-1,3,5-triazin-6-yl, 2-chloro-4-phenoxy-1,3,5-triazin-6-yl, 2-chloro-4-(4-sulfophenoxy)-1,3,5-triazin-6-yl, 2-chloro-4-methylmercapto-1,3,5-triazin-6-yl, 4-amino-2-chloro-1,3,5-triazin-6-yl, 2-chloro-4-methylamino-1,3,5-triazin-6-yl, 2-chloro-4-morpholino-1,3,5-triazin-6-yl, 2-chloro-4-phenylamino-1,3,5-triazin-6-yl, 2-chloro-4-methylphenylamino-1,3,5-triazin-6-yl, 2-chloro-4-(2-sulfophenylamino)-1,3,5-triazin-6-yl, 2-chloro-4-(3-sulfophenylamino)-1,3,5-triazin-6-yl, 2-chloro-4-(4-sulfophenylamino)-1,3,5-triazin-6-yl, 2-chloro-4-(2,5-disulfophenyl-amino)-1,3,5-triazin-6-yl, 2-chloro-4-(3-trimethylammonio-phenylamino)-1,3,5-triazin-6-yl, 2-chloro-4-(4-trimethylammoniophenylamino)-1,3,5-triazin-6-yl, 2-chloro-4-cyanamido-1,3,5-triazin-6-yl, 2-chloro-4-(2-sulfoethylamino)-1,3,5-triazin-6-yl, 2-chloro-4-(2-sulfoethylmethylamino)-1,3,5-triazin-6-yl, 2-chloro-4-(3-carboxy-pyridino)-1,3,5-triazin-6-yl, 2-chloro-4-(4-carboxypyridino)-1,3,5-triazin-6-yl, 2-chloro-4-(3-carbamoylpyridino)-1,3,5-triazin-6-yl, 2-chloro-4-(4-carbamoyl-pyridino)-1,3,5-triazin-6-yl, 2-chloro-4-(2-(2-sulfatoethylsulfonyl)-phenylamino)-1,3,5-triazin-6-yl, 2-chloro-4-(3-(2-sulfatoethylsulfonyl)-phenylamino)-1,3,5-triazin-6-yl, 2-chloro-4-(4-(2-sulfatoethylsulfonyl)-phenylamino)-1,3,5-triazin-6-yl, 2-chloro-4-(N-ethyl-4-(2-sulfatoethylsulfonyl)-phenylamino)-1,3,5-triazin-6-yl, 2-chloro-4-(2-carboxy-5-(2-sulfatoethylsulfonyl)-phenylamino)-1,3,5-triazin-6-yl, 2-chloro-4-(2-chloro-4-(2-sulfatoethylsulfonyl)-phenylamino)-1,3,5-triazin-6-yl, 2-chloro-4-(2-chloro-5-(2-sulfatoethylsulfonyl)-phenylamino)-1,3,5-triazin-6-yl, 2-chloro-4-(2-bromo-4-(2-sulfatoethylsulfonyl)-phenylamino)-1,3,5-triazin-6-yl, 2-chloro-4-(2-sulfo-4-(2-sulfatoethylsulfonyl)-phenylamino)-1,3,5-triazin-6-yl, 2-chloro-4-(2-sulfo-5-(2-sulfatoethylsulfonyl)-phenylamino)-1,3,5-triazin-6-yl, 2-chloro-4-(2-methoxy-5-(2-sulfatoethylsulfonyl)-phenylamino)-1,3,5-triazin-6-yl, 2-chloro-4-(2,5-dimethoxy-4-(2-sulfatoethylsulfonyl)-phenylamino)-1,3,5-triazin-6-yl, 2-chloro-4-(2-methoxy-5-methyl-4-(2-sulfatoethylsulfonyl)-phenylamino)-1,3,5-triazin-6-yl, 2-chloro-4-(2-methyl-4-(2-sulfatoethylsulfonyl)-phenylamino)-1,3,5-triazin-6-yl, 2-chloro-4-(2-(vinylsulfonyl)-phenylamino)-1,3,5-triazin-6-yl, 2-chloro-4-(3-(vinylsulfonyl)-phenylamino)-1,3,5-triazin-6-yl, 2-chloro-4-(4-(vinylsulfonyl)-phenylamino)-1,3,5-triazin-6-yl, 2-chloro-4-(N-ethyl-4-(vinylsulfonyl)-phenylamino)-1,3,5-triazin-6-yl, 2-chloro-4-(6-(2-sulfatoethylsulfonyl)-naphth-2-ylamino)-1,3,5-triazin-6-yl, 2-chloro-4-(8-(2-sulfatoethylsulfonyl)-naphth-2-ylamino)-1,3,5-triazin-6-yl, 2-chloro-4-(8-(2-sulfatoethylsulfonyl)-6-sulfo-naphth-2-ylamino)-1,3,5-triazin-6-yl, 2-chloro-4-(3-(2-(2-sulfatodthylsulfonyl)-ethylcarbamoyl)-phenylamino)-1,3,5-triazin-6-yl, 2-chloro-4-(3-(2-(vinylsulfonyl)-ethylcarbamoyl)-phenylamino)-1,3,5-triazin-6-yl, 2-chloro-4-(4-(N-methyl-2-(2-sulfatoethylsulfonyl)-ethylcarbamoyl)-phenylamino)-1,3,5-triazin-6-yl, 2-chloro-4-(4-(N-phenyl-2-(2-sulfatoethylsulfonyl)-ethylcarbamoyl)-phenyl-amino)-1,3,5-triazin-6-yl, 2-chloro-4-(4-(3-(2-sulfatoethylsulfonyl)-phenyl-carbamoyl)-phenylamino)-1,3,5-triazin-6-yl, 2-chloro-4-(4-(4-(2-sulfatoethyl-sulfonyl)-phenylcarbamoyl)-phenylamino)-1,3,5-triazin-6-yl, 2-chloro-4-(3-(3-(2-sulfatoethylsulfonyl)-phenylcarbamoyl)-phenylamino)-1,3,5-triazin-6-yl, 2-chloro-4-(3-(4-(2-sulfatoethylsulfonyl)-phenylcarbamoyl)-phenylamino)-1,3,5-triazin-6-yl, 2-chloro-4-(3-(2-sulfatoethylsulfonyl)-propylamino)-1,3,5-triazin-6-yl, 2-chloro-4-(N-methyl-N-(2-(2-sulfatoethylsulfonyl)-ethyl)-amino)-1,3,5-triazin-6-yl, 2-chloro-4-(N-phenyl-N-(2-(2-sulfatoethylsulfonyl)-ethyl)-amino)-1,3,5-triazin-6-yl, 2-fluoro-4-hydroxy-1,3,5-triazin-6-yl, 2-fluoro-4-methoxy-1,3,5-triazin-6-yl, 2-fluoro-4-phenoxy-1,3,5-triazin-6-yl, 2-fluoro-4-(4-sulfophenoxy)-1,3,5-triazin-6-yl, 2-fluoro-4-morpholino-1,3,5-triazin-6-yl, 2-fluoro-4-phenylamino-1,3,5-triazin-6-yl, 2-fluoro-4-methylphenylamino-1,3,5-triazin-6-yl, 2-fluoro-4-(2-sulfophenylamino)-1,3,5-triazin-6-yl, 2-fluoro-4-(3-sulfophenylamino)-1,3,5-triazin-6-yl, 2-fluoro-4-(4-sulfophenylamino)-1,3,5-triazin-6-yl, 2-fluoro-4-(2,5-disulfophenylamino)-1,3,5-triazin-6-yl, 2-fluoro-4-(3-trimethylammoniophenylamino)-1,3,5-triazin-6-yl, 2-fluoro-4-(4-trimethylammoniophenylamino)-1,3,5-triazin-6-yl, 2-fluoro-4-(2-(2-sulfatoethylsulfonyl)-phenylamino)-1,3,5-triazin-6-yl, 2-fluoro-4-(3-(2-sulfato-ethylsulfonyl)-phenylamino)-1,3,5-triazin-6-yl, 2-fluoro-4-(4-(2-sulfatoethylsulfonyl)-phenylamino)-1,3,5-triazin-6-yl, 2-fluoro-4-(N-ethyl-4-(2-sulfatoethylsulfonyl)-phenylamino)-1,3,5-triazin-6-yl, 2-fluoro-4-(2-carboxy-5-(2-sulfatoethylsulfonyl)-phenylamino)-1,3,5-triazin-6-yl, 2-fluoro-4-(2-chloro-4-(2-sulfatoethylsulfonyl)-phenylamino)-1,3,5-triazin-6-yl, 2-fluoro-4-(2-chloro-5-(2-sulfa 2-fluoro-4-(N-ethyl-4-(vinylsulfonyl)-phenylamino)-1,3,5-triazin-6-yl, 2-fluoro-4-(3-(2-(2-sulfatoethylsulfonyl)-ethylcarbamoyl)-phenylamino)-1,3,5-triazin-6-yl, 2-fluoro-4-(3-(2-(vinylsulfonyl)-ethylcarbamoyl)-phenylamino)-1,3,5-triazin-6-yl, 2-fluoro-4-(4-(N-methyl-2-(2-sulfatoethylsulfonyl)-ethylcarbamoyl)-phenylamino)-1,3,5-triazin-6-yl, 2-fluoro-4-(4-(N-phenyl-2-(2-sulfatoethylsulfonyl)-ethylcarbamoyl)-phenylamino)-1,3,5-triazin-6-yl, 2-fluoro-4-(4-(3-(2-sulfatoethylsulfonyl)-phenylcarbamoyl)-phenylamino)-1,3,5-triazin-6-yl, 2-fluoro-4-(4-(4-(2-sulfatoethylsulfonyl)-phenylcarbamoyl)-phenylamino)-1,3,5-triazin-6-yl, 2-fluoro-4-(3-(3-(2-sulfato-ethylsulfonyl)- phenylcarbamoyl)-phenylamino)-1,3,5-triazin-6-yl, 2-fluoro-4-(3-(4-(2-sulfatoethylsulfonyl)-phenylcarbamoyl)-phenylamino)-1,3,5-triazin-6-yl, 2-fluoro-4-(3-(2-sulfatoethylsulfonyl)-propylamino)-1,3,5-triazin-6-yl, 2-fluoro-4-(N-methyl-N-(2-(2-sulfatoethylsulfonyl)-ethyl)-amino)-1,3,5-triazin-6-yl, 2-fluoro-4-(N-phenyl-N-(2-(2-sulfatoethylsulfonyl)-ethyl)-amino)-1,3,5-triazin-6-yl, 2,4-di(4-(2-sulfato-ethylsulfonyl)-phenylamino)-1,3,5-triazin-6-yl, 2,4-di(3-(2-sulfatoethylsulfonyl)-phenylamino)-1,3,5-triazin-6-yl, 2-(3-(2-sulfatoethylsulfonyl)-phenylamino)-4-(4-(2-sulfatoethylsulfonyl)-phenylamino)-1,3,5-triazin-6-yl, 2-(N-ethyl-4-(2-sulfato-ethylsulfonyl)-phenylamino)4-(4-(2-sulfatoethylsulfonyl)-phenylamino)-1,3,5-triazin-6-yl, 2-(N-ethyl-4-(2-sulfatoethylsulfonyl)-phenylamino)4-(3-(2-sulfatoethyl-sulfonyl)-phenylamino)-1,3,5-triazin-6-yl, 2-(N-ethyl-3-(2-sulfatoethylsulfonyl)-phenylamino)-4-(4-(2-sulfatoethylsulfonyl)-phenylamino)-1,3,5-triazin-6-yl, 2-(N-ethyl-3-(2-sulfatoethylsulfonyl)-phenylamino)-4-(3-(2-sulfatoethylsulfonyl)-phenylamino)-1,3,5-triazin-6-yl, 2,4-di(N-ethyl-4-(2-sulfatoethylsulfonyl)-phenylamino)-1,3,5-triazin-6-yl, 2,4-di(3-(vinylsulfonyl)-phenylamino)-1,3,5-triazin-6-yl, 2,4-di(4-(vinylsulfonyl)-phenylamino)-1,3,5-triazin-6-yl, 2-(3-carboxy-pyridino)-4-morpholino-1,3,5-triazin-6-yl, 2-(4-carboxypyridino)-4-(3-sulfophenyl-amino)-1,3,5-triazin-6-yl, 2-(3-carbamoylpyridino)-4-(2-sulfophenylamino)-1,3,5-triazin-6-yl, 2-(4-carbamoylpyridino)-4-(4-(2-sulfatoethylsulfonyl)-phenylamino)-1,3,5-triazin-6-yl, 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl, 4,5-difluoro-pyrimidin-6-yl, 5-chloro-4-fluoro-pyrimidin-6-yl, 2,4,5-trichloro-pyrimidin-6-yl, 4,5-dichloro-pyrimidin-6-yl, 2,4-dichloro-pyrimidin-6-yl, 4-fluoro-pyrimidin-6-yl, 4-chloro-pyrimidin-6-yl, 2,3-dichloroquinoxaline-6-carbonyl.

Preferably, $Z^{21}$ is 2,4-dichloro-1,3,5-triazin-6-yl, 2-chloro-4-(3-carboxypyridino)-1,3,5-triazin-6-yl, 2-chloro-4-(4-carboxypyridino)-1,3,5-triazin-6-yl, 2-chloro-4-(3-carbamoylpyridino)-1,3,5-triazin-6-yl, 2-chloro-4-(4-carbamoylpyridino)-1,3,5-triazin-6-yl, 2-chloro-4-(3-(2-sulfatoethylsulfonyl)-phenylamino)-1,3,5-triazin-6-yl, 2-chloro-4-(4-(2-sulfatoethylsulfonyl)-phenylamino)-1,3,5-triazin-6-yl, 2-chloro-4-(3-(vinylsulfonyl)-phenylamino)-1,3,5-triazin-6-yl, 2-chloro-4-(4-(vinylsulfonyl)-phenylamino)-1,3,5-triazin-6-yl, 2-chloro-4-(4-(3-(2-sulfatoethylsulfonyl)-phenylcarbamoyl)-phenylamino)-1,3,5-triazin-6-yl, 2-chloro-4-(4-(4-(2-sulfatoethylsulfonyl)-phenylcarbamoyl)-phenylamino)-1,3,5-triazin-6-yl, 2-chloro-4-(3-(3(2-sulfatoethylsulfonyl)-phenylcarbamoyl)-phenylamino)-1,3,5-triazin-6-yl, 2-chloro-4-(3-(4-(2-sulfatoethylsulfonyl)-phenylcarbamoyl)-phenylamino)-1,3,5-triazin-6-yl, 2-chloro-4-(N-methyl-N-(2-(2-sulfatoethylsulfonyl)-ethyl)-amino)-1,3,5-triazin-6-yl, 2-chloro-4-(N-phenyl-N-(2-(2-sulfatoethylsulfonyl)-ethyl)-amino)-1,3,5-triazin-6-yl, 2-fluoro-4-morpholino-1,3,5-triazin-6-yl, 2-fluoro-4-(2-sulfophenylamino)-1,3,5-triazin-6-yl, 2-fluoro-4-(3-sulfophenylamino)-1,3,5-triazin-6-yl, 2-fluoro-4-(4-sulfophenylamino)-1,3,5-triazin-6-yl, 2-fluoro-4-(3-trimethylammoniophenylamino)-1,3,5-triazin-6-yl, 2-fluoro-4-(4-trimethylammoniophenylamino)-1,3,5-triazin-6-yl, 2-fluoro-4-(3-(2-sulfatoethylsulfonyl)-phenylamino)-1,3,5-triazin-6-yl, 2-fluoro-4-(4-(2-sulfatoethylsulfonyl)-phenylamino)-1,3,5-triazin-6-yl, 2-fluoro-4-(3-(2-sulfatoethylsulfonyl)-phenylcarbamoyl)-phenylamino)-1,3,5-triazin-6-yl, 2-fluoro-4-(4-(2-sulfatoethylsulfonyl)-phenylcarbamoyl)-phenylamino)-1,3,5-triazin-6-yl, 2-fluoro-4-(3-(3-(2-sulfatoethylsulfonyl)-phenylcarbamoyl)-phenylamino)-1,3,5-triazin-6-yl, 2-fluoro-4-(3-(4-(2-sulfatoethylsulfonyl)-phenylcarbamoyl)-phenylamino)-1,3,5-triazin-6-yl, 2-fluoro-4-(N-methyl-N-(2-(2-sulfatoethylsulfonyl)-ethyl)-amino)-1,3,5-triazin-6-yl, 2-fluoro-4-(N-phenyl-N-(2-(2-sulfatoethylsulfonyl)-ethyl)-amino)-1,3,5-triazin-6-yl, 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl, 2,3-dichloroquinoxaline-6-carbonyl.

Particularly preferably, $Z^{21}$ is 2,4-dichloro-1,3,5-triazin-6-yl, 2-chloro-4-(3-(2-sulfatoethylsulfonyl)-phenylamino)-1,3,5-triazin-6-yl, 2-chloro-4-(4-(2-sulfatoethylsulfonyl)-phenylamino)-1,3,5-triazin-6-yl, 2-chloro-4-(3-(vinylsulfonyl)-phenylamino)-1,3,5-triazin-6-yl, 2-chloro-4-(4-(vinylsulfonyl)-phenylamino)-1,3,5-triazin-6-yl, 2-chloro-4-(N-methyl-N-(2-(2-sulfatoethylsulfonyl)-ethyl)-amino)-1,3,5-triazin-6-yl, 2-chloro-4-(N-phenyl-N-(2-(2-sulfatoethylsulfonyl)-ethyl)-amino)-1,3,5-triazin-6-yl, 2-fluoro-4-morpholino-1,3,5-triazin-6-yl, 2-fluoro-4-(2-sulfophenylamino)-1,3,5-triazin-6-yl, 2-fluoro-4-(3-sulfophenylamino)-1,3,5-triazin-6-yl, 2-fluoro-4-(4-sulfophenylamino)-1,3,5-triazin-6-yl, 2-fluoro-4-(3-trimethylammoniophenylamino)-1,3,5-triazin-6-yl, 2-fluoro-4-(4-trimethylammoniophenylamino)-1,3,5-triazin-6-yl, 2-fluoro-4-(3-(2-sulfatoethylsulfonyl)-phenylamino)-1,3,5-triazin-6-yl, 2-fluoro-4-(4-(2-sulfatoethylsulfonyl)-phenylamino)-1,3,5-triazin-6-yl, 2-fluoro-4-(3-(vinylsulfonyl)-phenylamino)-1,3,5-triazin-6-yl, 2-fluoro-4-(4-(vinylsulfonyl)-phenylamino)-1,3,5-triazin-6-yl, 2-fluoro-4-(N-methyl-N-(2-(2-sulfatoethylsulfonyl)-ethyl)-amino)-1,3,5-triazin-6-yl, 2-fluoro-4-(N-phenyl-N-(2-(2-sulfatoethylsulfonyl)-ethyl)-amino)-1,3,5-triazin-6-yl, 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl, 2,3-dichloroquinoxaline-6-carbonyl.

In the general formula (II), the bond leading to the diazo group preferably attaches to the naphthalene nucleus in the β-position when $D^3$ represents a group of the general formula (6).

When $D^3$ represents a group of the general formula (5) and $X^2$ is —$SO_2Z$, the $SO_2Z$ group is preferably meta or para to the diazo group.

Preferred mixtures contain one or more dyes of the general formula (Ia)

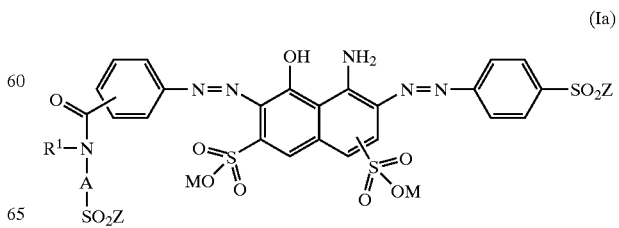

(Ia)

and one or more dyes of the general formula (IIa)

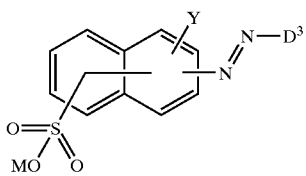

In the general formulae (Ia) and (IIa), M, A, $R^1$, Z, $D^3$ and Y are each as defined above.

In the general formula (Ia), it is particularly preferable for A to be phenylene and Z vinyl or β-sulfatoethyl.

In the general formula (Ia), it is most preferable for A to be phenylene, $R^1$ to be hydrogen and Z to be vinyl or β-sulfatoethyl.

The dye mixtures according to the invention contain bisazo dyes of the general formula (I) in an amount of 30 to 95% by weight and preferably 50 to 90% by weight and monoazo dyes of the general formula (II) in an amount of 5 to 70% by weight and preferably 10 to 50% by weight.

Optionally, the dye mixtures according to the invention may also contain one or more monoazo dyes of the general formulae (14) or (15) in an amount of up to 10% by weight,

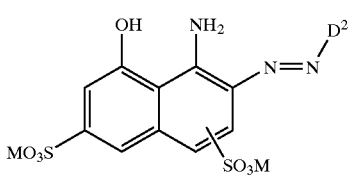

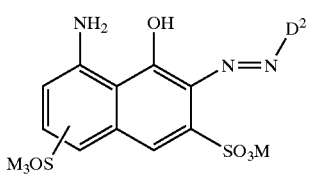

where M and $D^2$ are each as defined above. It is particularly preferable for D2 to be 4-(2-sulfatoethylsulfonyl)-phenyl or 4-vinylsulfonyl-phenyl.

Dyes of the general formula (I) are known from EP-A-1 046 677, the dyes of the general formula (II) are known from DE-A-19 11 427 and from the literature or can be prepared via standard synthetic methods. Dyes of the general formula (14) and (15) are likewise obtainable via standard synthetic methods or are in some instances formed during the synthesis of dyes of the general formula (I). They are customarily used as shading components.

The dye mixtures according to the invention can be present as a preparation in solid or liquid (dissolved) form. In solid form, they contain, to the extent necessary, the electrolyte salts customary in the case of water-soluble and especially fiber-reactive dyes, such as sodium chloride, potassium chloride and sodium sulfate, and may further contain the auxiliaries customary in commercial dyes, such as buffer substances capable of setting a pH in aqueous solution between 3 and 7, such as sodium acetate, sodium citrate, sodium borate, sodium bicarbonate, sodium dihydrogenphosphate and disodium hydrogenphosphate, dyeing auxiliaries, dustproofing agents and small amounts of siccatives; when they are present in a liquid, aqueous solution (including a content of thickeners of the type customary in print pastes), they may also contain substances which ensure a long life for these preparations, for example mold preventatives.

In solid form, the dye mixtures according to the invention are generally present as powders or granules which contain electrolyte salt and which will hereinbelow generally be referred to as a preparation with or without one or more of the abovementioned auxiliaries. In the preparations, the dye mixture is present at 20 to 90% by weight, based on the preparation containing it. The buffer substances are generally present in a total amount of up to 10% by weight, based on the preparation.

When the dye mixtures according to the invention are present in an aqueous solution, the total dye content of these aqueous solutions is up to about 50% by weight, for example between 5 and 50%, the electrolyte salt content of these aqueous solutions preferably being below 10% by weight, based on the aqueous solution; the aqueous solutions (liquid preparations) can contain the aforementioned buffer substances in an amount which is generally up to 5% by weight and preferably up to 2% by weight.

The dye mixtures according to the invention are preparable in a conventional manner, as by mechanically mixing the individual dyes, whether in the form of their dye powders or granules or their as-synthesized solutions or in the form of aqueous solutions of the individual dyes generally, which may additionally contain customary auxiliaries, or by conventional diazotization and coupling of suitable mixtures of diazo and coupling components in the desired amount ratios.

For example, when $D^1$ and $D^3$ have the same meanings as per the general formulae (I) and (II), an amine of the general formula (16)

$$D^1-NH_2 \quad (16)$$

where D is as defined above, can be diazotized in a conventional manner and the resulting diazonium compound then reacted at a pH between 4 and 8 with an aqueous solution or suspension of a monoazo dye conforming to the general formula (14) and of a compound of the general formula (17)

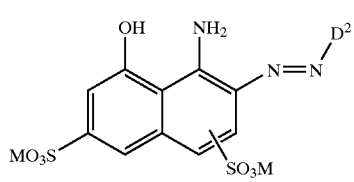

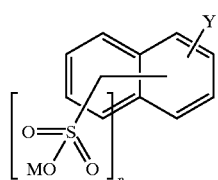

where M, Y, n and $D^2$ are each as defined above.

The dye mixture according to the invention is isolated in a conventional manner by salting out for example with sodium chloride or potassium chloride or by spray drying.

Dye mixtures which as well as β-chloroethylsulfonyl or β-thiosulfatoethylsulfonyl or β-sulfatoethylsulfonyl groups also contain vinylsulfonyl groups as reactive radicals can be synthesized not only starting from appropriately substituted vinylsulfonylanilines or naphthylamines but also by reaction of a dye mixture where Z is β-chloroethyl, β-thiosulfatoethyl or β-sulfatoethyl with an amount of alkali required for the desired fraction and converting the β-substituted ethylsulfonyl groups mentioned into vinylsulfonyl groups. This conversion is effected in a manner familiar to one skilled in the art.

The dye mixtures according to the invention have useful application properties. They are used for dyeing or printing hydroxyl- and/or carboxamido-containing materials, for example in the form of sheetlike structures, such as paper and leather or of films, for example composed of polyamide, or in bulk, as for example polyamide and polyurethane, but especially for dyeing and printing these materials in fiber form.

Similarly, the as-synthesized solutions of the dye mixtures according to the invention can be used directly as a liquid preparation for dyeing, if appropriate after addition of a buffer substance and if appropriate after concentration or dilution.

The present invention thus also provides for the use of the dye mixtures according to the invention for dyeing or printing these materials, or rather processes for dyeing or printing these materials in a conventional manner, by using a dye mixture according to the invention or its individual components (dyes) individually together as a colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose and also chemically modified cellulose fibers, such as aminated cellulose fibers or fibers as described for example in WO 96/37641 and WO 96/37642 and also in EP-A-0 538 785 and EP-A-0 692 559.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dye mixtures according to the invention can be applied to and fixed on the substrates mentioned, especially the fiber materials mentioned, by the application techniques known for water-soluble dyes and especially for fiber-reactive dyes. For instance, on cellulose fibers they produce by the exhaust method from a long liquor and also from a short liquor, for example in a liquor to goods ratio of 5:1 to 100:1, preferably 6:1 to 30:1, using various acid-binding agents and optionally neutral salts as far as necessary, such as sodium chloride or sodium sulfate, dyeings having very good color yields. Application is preferably from an aqueous bath at temperatures between 40 and 105° C., optionally at a temperature of up to 130° C. under superatmospheric pressure, but preferably at 30 to 95° C., especially 45 to 65° C., in the presence or absence of customary dyeing auxiliaries. One possible procedure here is to introduce the material into the bath and to gradually heat the bath to the desired dyeing temperature and complete the dyeing process at that temperature. The neutral salts which accelerate the exhaustion of the dyes may also if desired only be added to the bath after the actual dyeing temperature has been reached.

Padding processes likewise provide excellent color yields and a very good color build-up on cellulose fibers, the dyes being fixable in a conventional manner by batching at room temperature or elevated temperature, for example at up to 60° C., or in a continuous manner, for example by means of a pad-dry-pad steam process, by steaming or using dry heat.

Similarly, the customary printing processes for cellulose fibers, which can be carried out in one step, for example by printing with a print paste containing sodium bicarbonate or some other acid-binding agent and by subsequent steaming at 100 to 103° C., or in two steps, for example by printing with a neutral to weak acidic print color and then fixing either by passing the printed material through hot electrolyte-containing alkaline bath or by overpadding with an alkaline electrolyte-containing padding liquor and subsequent batching of the alkali-overpadded material or subsequent steaming or subsequent dry heat treatment of the alkali-overpadded material, produce strong prints with well-defined contours and a clear white ground. The outcome of the prints is little affected, if at all, by variations in the fixing conditions.

When fixing by means of dry heat in accordance with the customary thermofix processes, hot air at 120 to 200° C. is used. In addition to the customary steam at 101 to 103° C., it is also possible to use superheated steam and high-pressure steam at temperatures of up to 160° C.

The acid-binding agents which effect the fixation of the dye mixtures according to the invention on the cellulose fibers are for example water-soluble basic salts of alkali metals and likewise alkaline earth metals of inorganic or organic acids or compounds which liberate alkali in the heat, and also alkali metal silicates. Especially suitable are the alkali metal hydroxides and alkali metal salts of weak to medium inorganic or organic acids, the preferred alkali metal compounds being the sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, trisodium phosphate waterglass or mixtures thereof, for example mixtures of aqueous sodium hydroxide solution and waterglass.

The dye mixtures according to the invention are notable for outstanding color strength when applied to the cellulose fiber materials by dyeing or printing in the presence of no or very small amounts of alkali or alkaline earth metal compounds. For instance, no electrolyte salt is required for a shallow depth of shade, not more than 5 g/l of electrolyte salt is required for a medium depth of shade and not more than 10 g/l of electrolyte salt is required for deep shades.

According to the invention, a shallow depth of shade refers to the use of 2% by weight of dye based on the substrate to be dyed, a medium depth of shade refers to the use of 2 to 4% by weight based on the substrate to be dyed and a deep shade refers to the use of 4 to 10% by weight of dye based on the substrate to be dyed.

The dyeing and prints obtainable with the dye mixtures according to the invention possess bright shades; more particularly, the dyeings and prints on cellulose fiber materials possess good lightfastness and especially good wetfastnesses, such as fastness to washing, milling, water, seawater, crossdyeing and acidic and alkaline perspiration, also good fastness to pleating, hotpressing and rubbing. Furthermore, the cellulose dyeings obtained following the customary aftertreatment of rinsing to remove unfixed dye portions exhibit excellent wetfastnesses, in particular since unfixed dye portions are easily washed off because of their good solubility in cold water.

Furthermore, the dye mixtures according to the invention can also be used for the fiber-reactive dyeing of wool. Moreover, wool which has been given a nonfelting or low-felting finish (cf. for example H. Rath, Lehrbuch der Textilchemie, Springer-Verlag, 3rd edition (1972), pages 295–299, especially finished by the Hercosett process (page 298); J. Soc. Dyers and Colourists 1972, 93–99, and 1975, 33–44), can be dyed to very good fastness properties. The process of dyeing on wool is here carried out in a conventional manner from an acidic medium. For instance, acetic acid and/or ammonium sulfate or acetic acid and ammonium sulfate or sodium acetate can be added to the dyebath to obtain the desired pH. To obtain a dyeing of acceptable levelness, it is advisable to add a customary leveling agent, for example a leveling agent based on a reaction product of cyanuric chloride with three times the molar amount of an aminobenzenesulfonic acid and/or of an aminonaphthalenesulfonic acid or on the basis of a reaction product of for example stearylamine with ethylene oxide. For instance, the dye mixture according to the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the dye mixtures according to the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures according to the invention is very good, they can also be used with advantage in customary continuous dyeing processes. The color strength of the dye mixtures according to the invention is very high.

The dye mixtures according to the invention dye the materials mentioned, preferably fiber materials, in navy to jet black shades having good fastness properties.

The examples hereinbelow serve to illustrate the invention. Parts and percentages are by weight, unless otherwise stated. Parts by weight relate to parts by volume as the kilogram relative to the liter. The compounds described in the examples in terms of a formula are indicated in the form of the sodium salts, since they are generally prepared and isolated in the form of their salts, preferably lithium, sodium or potassium salts, and used for dyeing in the form of their salts. The starting compounds described in the examples hereinbelow, especially the table examples, can be used in the synthesis in the form of the free acid or likewise in the form of their salts, preferably alkali metal salts, such as sodium or potassium salts.

EXAMPLE 1

80 parts of an electrolyte-containing dye powder containing the navy disazo dye of the formula (IA)

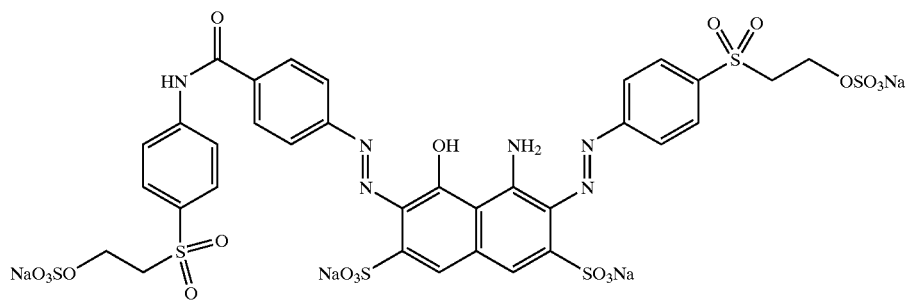

(IA)

in a 70% fraction and 20 parts of an electrolyte-containing dye powder containing the orange-colored monoazo dye of the formula (IIA) in a 75% fraction are mechanically mixed with each other.

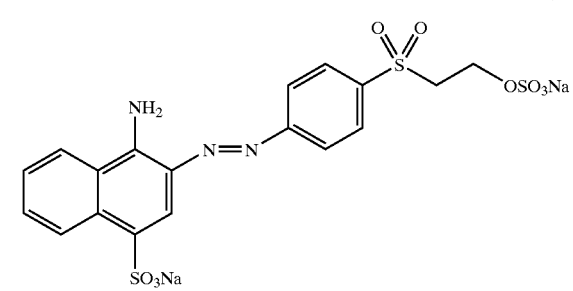

(IIA)

The resulting dye mixture according to the invention provides black dyeings and prints, on cotton for example, under the dyeing conditions customary for reactive dyes.

EXAMPLE 2

75 parts of an electrolyte-containing dye powder containing the navy disazo dye of the formula (IA) in a 70% fraction and 25 parts of an electrolyte-containing dye powder containing the orange-coloured monoazo dye of the formula (IIB)

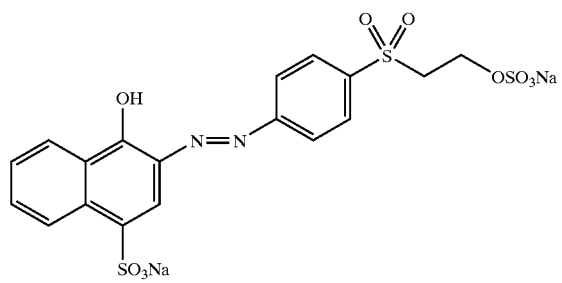

(IIB)

in a 75% fraction are dissolved in 700 parts of water and the resulting dye solution is adjusted to pH 5.5–6.5. Evaporation of this dye solution provides a dye mixture which provides black dyeings and prints on cotton under the dyeing conditions customary for reactive dyes.

EXAMPLE 3 a) 281 parts of 4-(β-sulfatoethylsulfonyl)aniline are suspended in 650 parts of ice-water and 180 parts of 30% hydrochloric acid and diazotized by dropwise addition of 173 parts of 40% sodium nitrite solution. 319 parts of 1-amino-8-naphthol-3,6-disulfonic acid were added and coupled in a first step at pH 1 to 1.3 at below 20° C. to form a red monoazo dye conforming to the general formula (14). The stated pH range is set and maintained during the coupling reaction by addition of a total of about 140 parts of sodium bicarbonate.

b) In a second, separate reaction vessel, 500 parts of 4-amino-N-(3-((β-sulfatoethyl)-sulfonyl)-phenyl)-benzamide are suspended in 2750 parts of ice-water, adjusted to pH 6.5–7 with about 90 parts of sodium carbonate and admixed with 217 parts of 40% sodium nitrite solution. This suspension is added dropwise to a mixture of 780 parts of ice, 630 parts of ice-water and 450 parts of concentrated hydrochloric acid. After subsequent stirring at 5–10° C. for 2 hours, the excess nitrite is reduced with amidosulfonic acid and the resulting diazo suspension is pumped into the solution of the red monoazo dye of a). This reaction mixture is then admixed with 76 parts of 2-hydroxynaphthalene-3,6-disulfonic acid.

The batch was then readjusted to pH 5–6 with sodium carbonate at below 25° C. and the 85:15 mixture of the dyes (IB) and (IIC) formed after the coupling reaction has ended is isolated by spray drying.

Alternatively, the dye solution obtained can also be buffered at pH 5.5–6 by addition of a phosphate buffer and be adjusted by further dilution or concentration to provide a liquid brand of defined strength.

The resulting dye mixture according to the invention dyes cotton in navy to black shades.

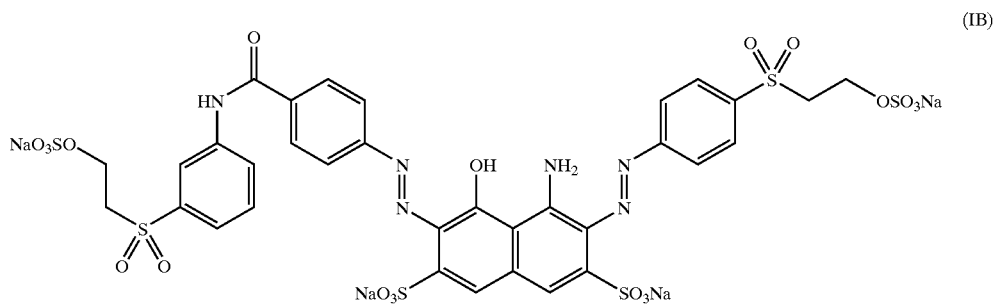

(IB)

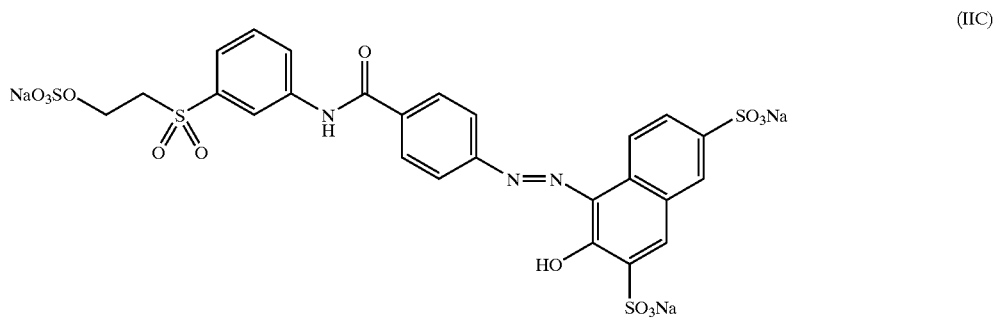

(IIC)

EXAMPLES 4 TO 229

The table examples hereinbelow describe further inventive mixtures of the dyes of the general formulae (I) and (II), each recited in the form of the sodium salts. The mixing ratios are indicated in percent by weight. The dye mixtures provide navy to jet black dyeings, on cotton for example, by the dyeing methods customary for reactive dyes.

| | | Dye mixtures according to example 1 or 2 | |
|---|---|---|---|
| Example | Dye of gen. formula (I) | Dye of gen. formula (II) | Ratio (I):(II) |
| 4 | (IA) | 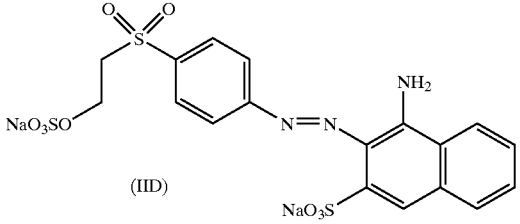 (IID) | 75:25 |
| 5 | (IA) | 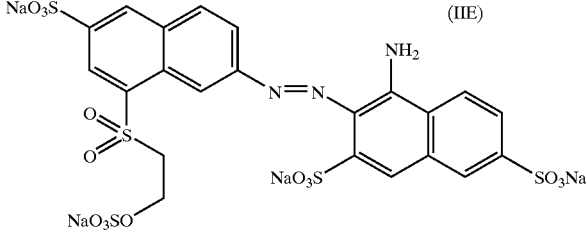 (IIE) | 80:20 |
| 6 | (IA) | 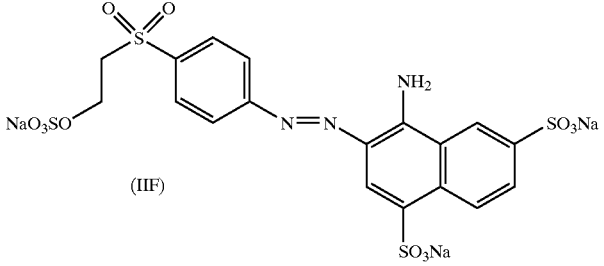 (IIF) | 70:30 |
| 7 | (IA) | 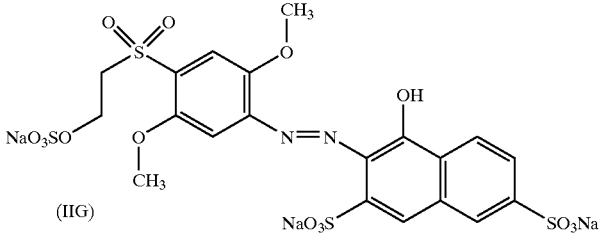 (IIG) | 80:20 |
| 8 | (IA) | 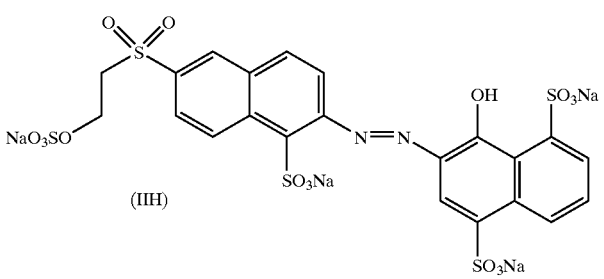 (IIH) | 80:20 |

-continued

Dye mixtures according to example 1 or 2

| Example | Dye of gen. formula (I) | Dye of gen. formula (II) | Ratio (I):(II) |
|---------|------------------------|--------------------------|----------------|
| 9  | (IA) | (IIJ) | 75:25 |
| 10 | (IA) | (IIK) | 80:20 |
| 11 | (IA) | (IIL) | 80:20 |
| 12 | (IA) | (IIM) | 75:25 |
| 13 | (IA) | (IIN) | 80:20 |
| 14 | (IA) | (IIP) | 80:20 |

-continued

| | Dye mixtures according to example 1 or 2 | | |
|---|---|---|---|
| Example | Dye of gen. formula (I) | Dye of gen. formula (II) | Ratio (I):(II) |
| 15 | (IA) | (IIQ) | 80:20 |
| 16 | (IA) | (IIR) | 75:25 |
| 17 | (IA) | (IIS) | 70:30 |
| 18 | (IA) | (IIT) | 85:15 |
| 19 | (IA) | (IIU) | 80:20 |

-continued
| | | Dye mixtures according to example 1 or 2 | |
|---|---|---|---|
| Example | Dye of gen. formula (I) | Dye of gen. formula (II) | Ratio (I):(II) |
| 20 | (IA) | (IIW) 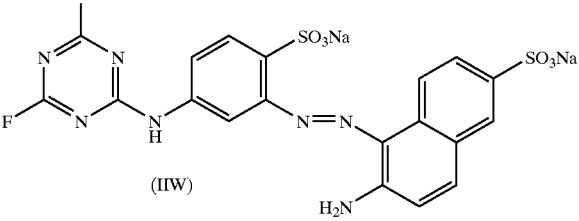 | 75:25 |
| 21 | (IA) | (IIY) 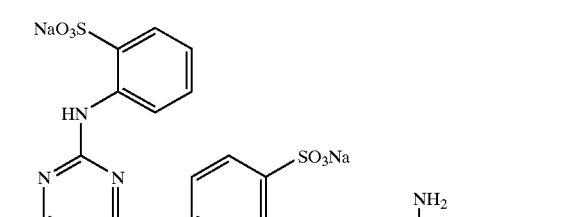 | 75:25 |
| 22 | (IA) | (IIZ) 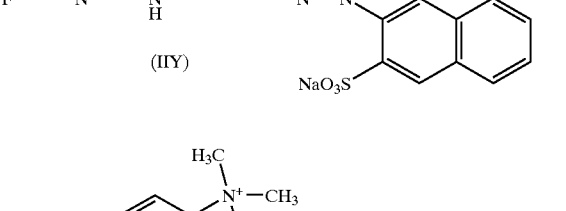 | 80:20 |
| 23 | (IA) | (IIAA) 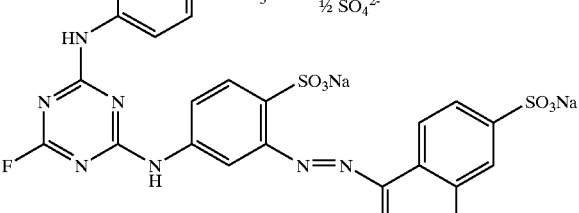 | 75:25 |

-continued
Dye mixtures according to example 1 or 2
| Example | Dye of gen. formula (I) | Dye of gen. formula (II) | Ratio (I):(II) |
|---|---|---|---|
| 24 | (IA) | 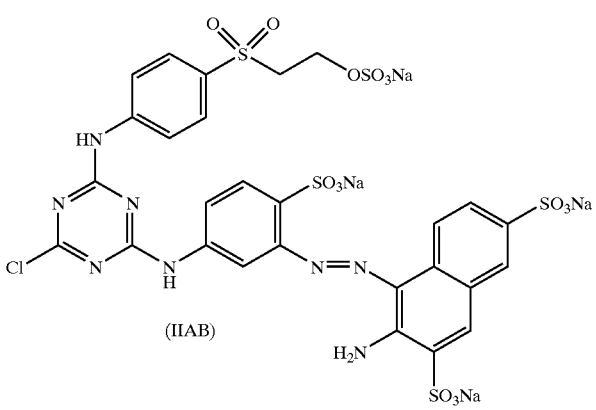 (IIAB) | 80:20 |
| 25 | (IA) | 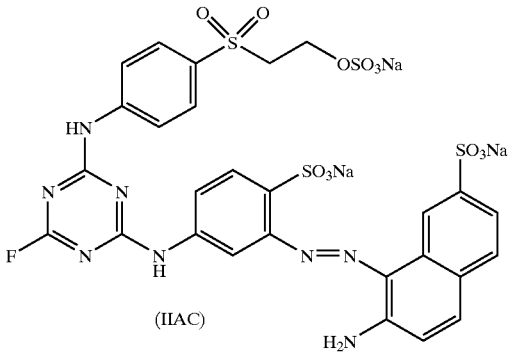 (IIAC) | 85:15 |
| 26 | (IA) | 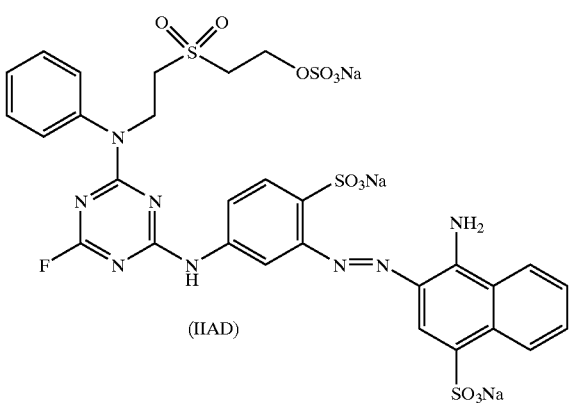 (IIAD) | 70:30 |

-continued

Dye mixtures according to example 1 or 2

| Example | Dye of gen. formula (I) | Dye of gen. formula (II) | Ratio (I):(II) |
|---|---|---|---|
| 27 | (IA) | (IIAE) | 70:30 |
| 28 | (IA) | (IIAF) | 80:20 |
| 29 | (IA) | (IIAG) | 85:15 |

-continued

Dye mixtures according to example 1 or 2

| Example | Dye of gen. formula (I) | Dye of gen. formula (II) | Ratio (I):(II) |
|---------|-------------------------|--------------------------|----------------|
| 30 | (IA) | (IIAH) | 75:25 |
| 31 | (IA) | (IIAJ) | 85:15 |
| 32 | (IA) | (IIAK) | 85:15 |

-continued
Dye mixtures according to example 1 or 2
| Example | Dye of gen. formula (I) | Dye of gen. formula (II) | Ratio (I):(II) |
|---|---|---|---|
| 33 | (IA) | 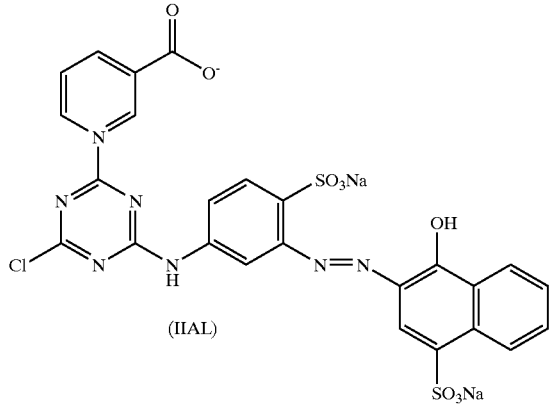<br>(IIAL) | 85:15 |
| 34 | (IA) | 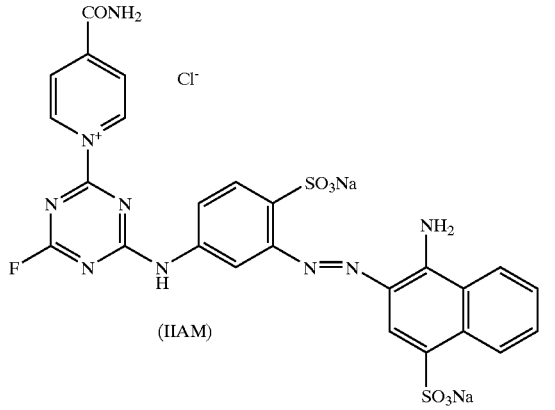<br>(IIAM) | 80:20 |
| 35 | (IA) | 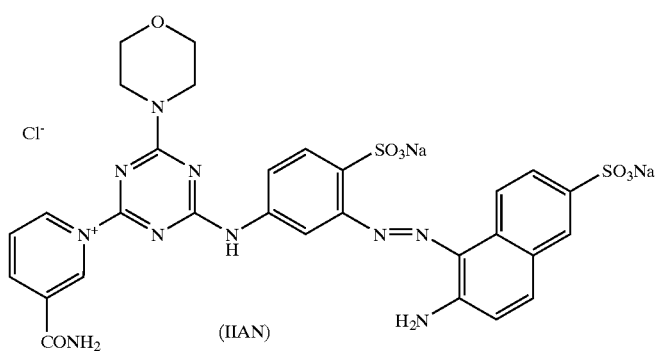<br>(IIAN) | 75:25 |

-continued
Dye mixtures according to example 1 or 2
| Example | Dye of gen. formula (I) | Dye of gen. formula (II) | Ratio (I):(II) |
|---|---|---|---|
| 36 | (IA) | 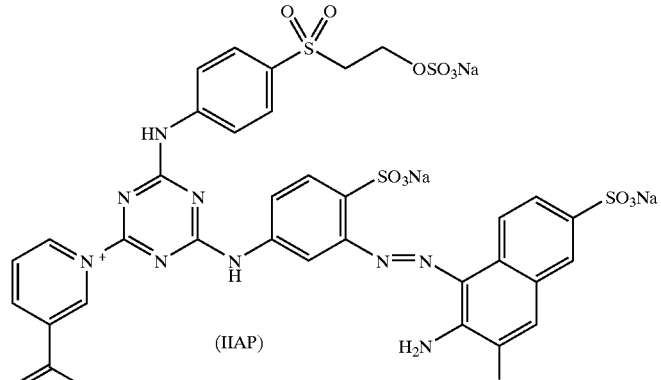<br>(IIAP) | 80:20 |
EXAMPLES 37–71
Repetition of Examples 1, 2 and 4–36 Using Dye (IB) Instead of Dye (IA).
EXAMPLES 72–106
Repetition of Examples 1, 2 and 4–36 Using Dye (IC) Instead of Dye (IA):
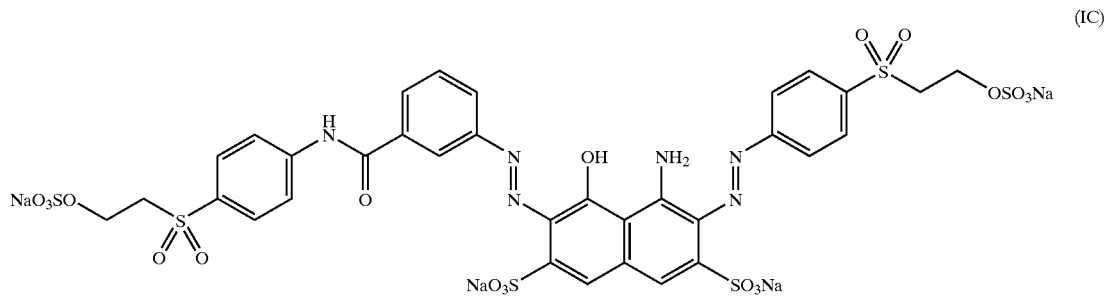
(IC)
EXAMPLES 107–141
Repetition of Examples 1, 2 and 4–36 Using Dye (ID) Instead of Dye (IA):
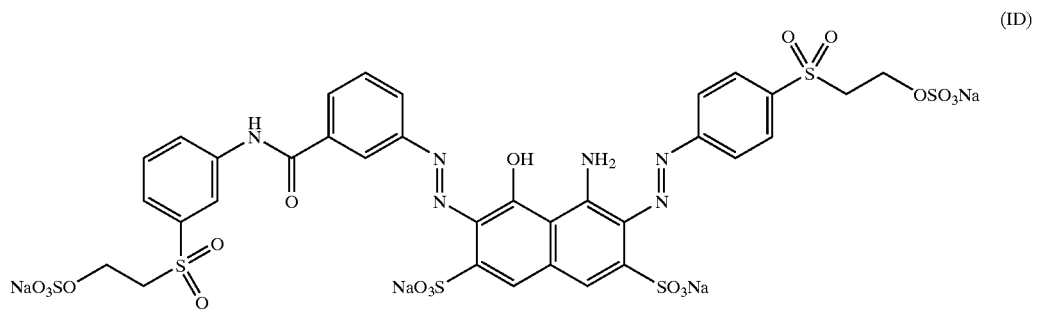
(ID)

Examples 142–176
Repetition of Examples 1, 2 and 4–36 Using Dye (IE) Instead of Dye (IA):
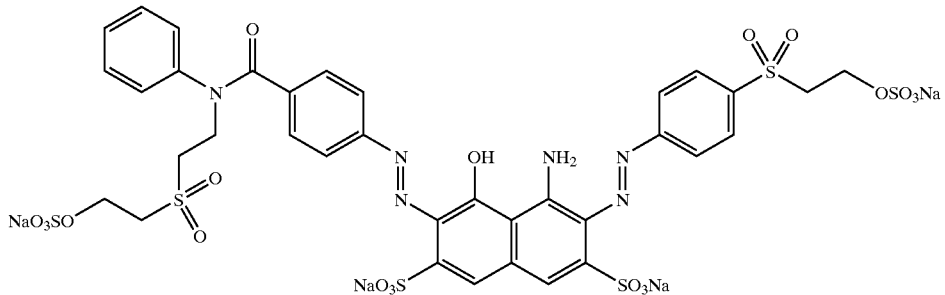
(IE)
Dye mixtures according to example 1, 2 or 3
| Example | Dye of gen. formula (I) | Dye of gen. formula (II) | Ratio (I):(II) |
|---|---|---|---|
| 177 | (IA) | (IIAQ) | 80:20 |
| 178 | (IA) | (IIAR) | 75:25 |
| 179 | (IA) | (IIAS) | 80:20 |

-continued
| Example | Dye of gen. formula (I) | Dye of gen. formula (II) | Ratio (I):(II) |
|---|---|---|---|
| 180 | (IB) | 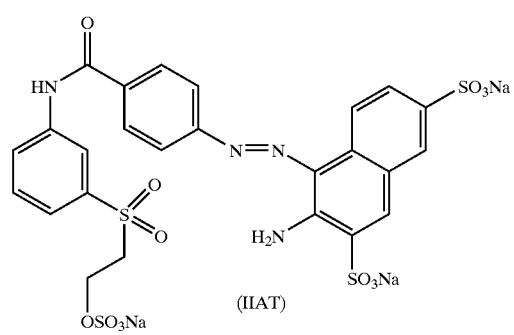 (IIAT) | 75:25 |
| 181 | (IB) | 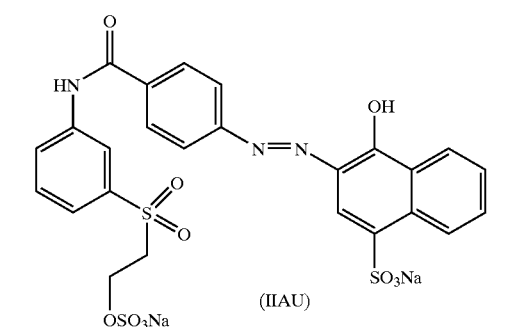 (IIAU) | 75:25 |
| 182 | (IC) | 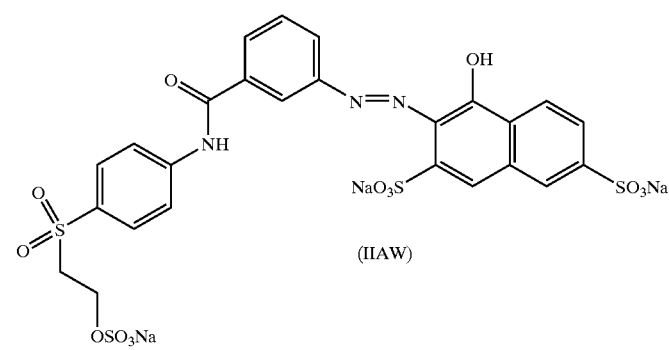 (IIAW) | 80:20 |
| 183 | (IC) | 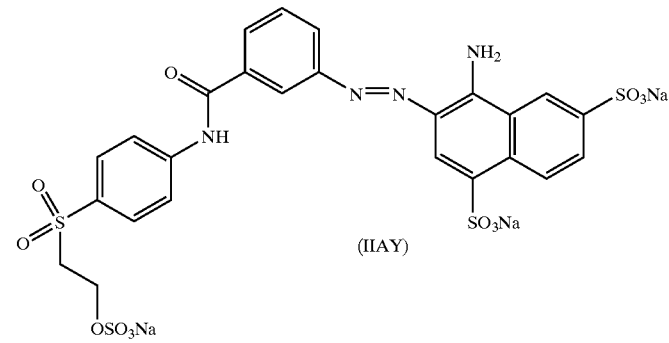 (IIAY) | 75:25 |

-continued

| Example | Dye of gen. formula (I) | Dye of gen. formula (II) | Ratio (I):(II) |
|---|---|---|---|
| 184 | (ID) | (IIAZ) | 80:20 |
| 185 | (ID) | (IIBA) | 75:25 |
| 186 | (IF) | (IIA) | 80:20 |
| 187 | (IF) | (IIB) | 80:20 |
| 188 | (IF) | (IID) | 80:20 |
| 189 | (IF) | (IIF) | 75:25 |
| 190 | (IF) | (IIJ) | 80:20 |
| 191 | (IF) | (IIK) | 80:20 |
| 192 | (IF) | (IIL) | 80:20 |
| 193 | (IF) | (IIM) | 80:20 |
| 194 | (IF) | (IIN) | 80:20 |
| 195 | (IF) | (IIQ) | 80:20 |
| 196 | (IF) | (IIS) | 75:25 |

EXAMPLES 197–207
Repetition of Examples 186–196 Using Dye (IG) Instead of Dye (IF):

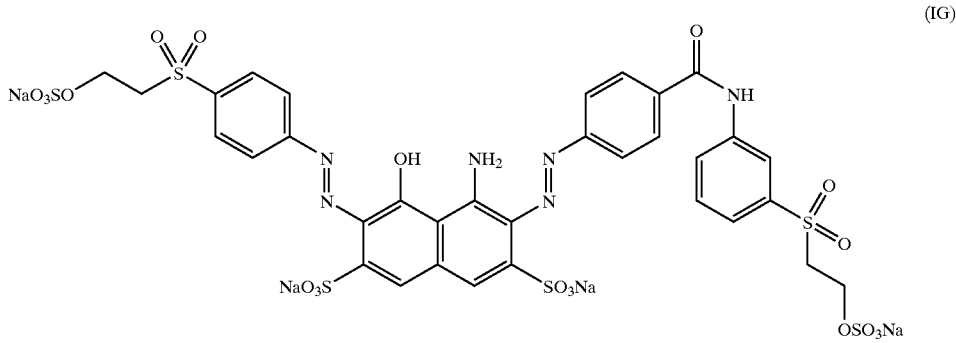

EXAMPLES 208–218
Repetition of examples 186–196 using dye (IH) instead of dye (IF):

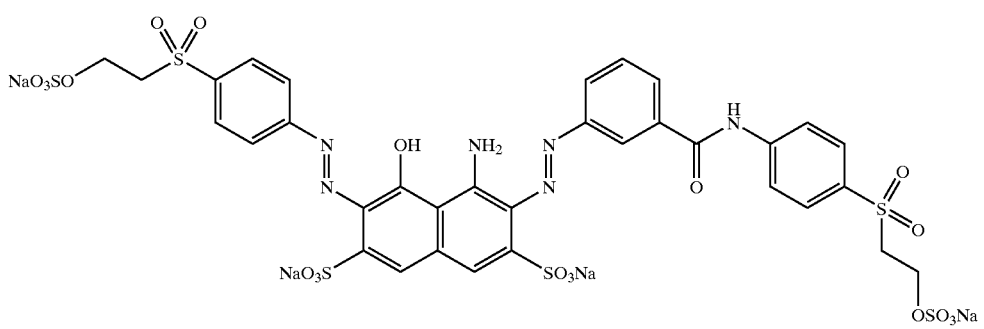

EXAMPLES 219–229
Repetition of examples 186–196 using dye (IJ) instead of dye (IF):

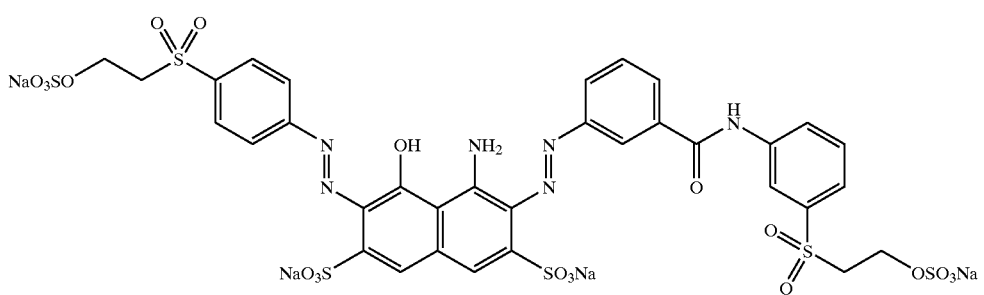

Thereafter, the dyed material is rinsed initially with tap water for 2 minutes and then with ion-free water for 5 minutes. The dyed material is neutralized at 40° C. in 1000 parts of an aqueous solution containing 1 part of 50% acetic acid for 10 minutes. It is subsequently rinsed with ion-free water at 70° C. and thereafter soaked off at the boil with a detergent for 15 minutes, rinsed once more and dried.

Use Example 1

2 parts of a dye obtained according to example 1–3 are dissolved in 999 parts of water and 5 parts of sodium carbonate, 0,7 part of sodium hydroxide (in the form of a 32.5% aqueous solution) and optionally 1 part of a wetting agent are added. The dyebath is entered with 100 g of a cotton fabric. The temperature of the dyebath is first maintained at 25° C. for 10 minutes, then raised over 30 minutes to the final temperature (40–60° C.) and maintained at that level for a further 60–90 minutes.

This gives a strong navy to gray dyeing having very good fastness properties.

Use Example 2

4 parts of a dye obtained according to example 1–3 and 5 parts of sodium chloride are dissolved in 999 parts of water, 7 parts of sodium carbonate, 0.7 part of sodium hydroxide (in the form of a 32.5% aqueous solution) and optionally 1 part of a wetting agent are added. This dyebath is entered with 100 g of a cotton fabric. The rest of the processing is as indicated in use example 1. This gives a strong navy to black dyeing having very good fastness properties.

Use Example 3

8 parts of a dye obtained according to example 1–3 and 10 parts of sodium chloride are dissolved in 997 parts of water, 10 parts of sodium carbonate, 1.3 parts of sodium hydroxide (in the form of a 32.5% aqueous solution) and optionally 1 part of a wetting agent are added. This dyebath is entered with 100 g of a cotton fabric. The rest of the processing is as indicated in use example 1. This gives a jet black dyeing having very good fastness properties.

I claim:

1. A reactive dye mixture comprising one or more dyes of the formula (I)

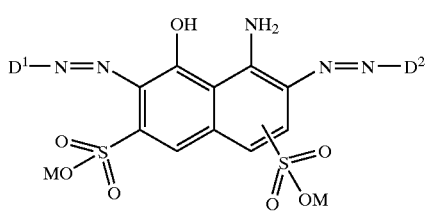
(I)

and one or more dyes of the formula (II)

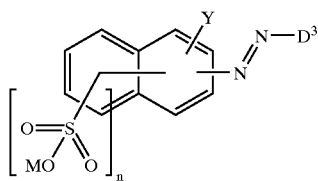
(II)

wherein:
$D^1$ and $D^2$ are each a group of the formula (1) or formula (5) or formula (6)

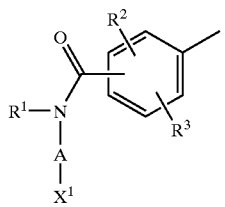
(1)

wherein
$R^1$ is hydrogen, $(C_1-C_4)$-alkyl, aryl or a substituted aryl radical;
$R^2$ and $R^3$ are independently hydrogen, $(C_1-C_4)$-alkyl, $(C_1-C_4)$-alkoxy, hydroxyl, sulfo, carboxyl, amido or halogen; and
A is a phenylene group of the formula (2)

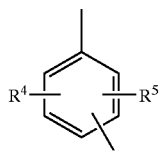
(2)

wherein
$R^4$ and $R^5$ are independently hydrogen, $(C_1-C_4)$-alkyl, $(C_1-C_4)$-alkoxy, hydroxyl, sulfo, carboxyl, amido or halogen; or a naphthylene group of the formula (3)

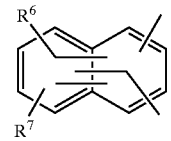
(3)

wherein
$R^6$ and $R^7$ are independently hydrogen, $(C_1-C_4)$-alkyl, $(C_1-C_4)$-alkoxy, hydroxyl, sulfo, carboxyl, amido or halogen; or a polymethylene group of the formula (4)

(4)

wherein
k is an integer greater than 1 and
$R^8$ and $R^9$ are independently hydrogen, $(C_1-C_4)$-alkyl, $(C_1-C_4)$-alkoxy, hydroxyl, cyano, amido, halogen or aryl; and
$X^1$ is hydrogen or a group of the formula —$SO_2$—Z;
wherein formula (5) is

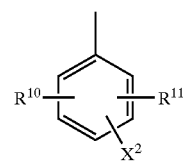
(5)

wherein
$R^{10}$ and $R^{11}$ are independently hydrogen, $(C_1-C_4)$-alkyl, $(C_1-C_4)$-alkoxy, hydroxyl, sulfo, carboxyl, amido or halogen; and
$X^2$ has one of the meanings of $X^1$;
wherein formula (6) is

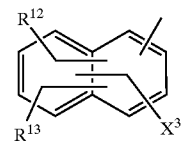
(6)

wherein
$R^{12}$ and $R^{13}$ are independently hydrogen, $(C_1-C_4)$-alkyl, $(C_1-C_4)$-alkoxy, hydroxyl, sulfo, carboxyl, amido or halogen; and
$X^3$ has one of the meanings of $X^1$;
Z is —CH=$CH_2$, —$CH_2CH_2Z^1$ or hydroxyl,
wherein
$Z^1$ is hydroxyl or an alkali-eliminable group; and
M is hydrogen, an alkali metal or one equivalent of an alkaline earth metal;
$D^3$ has one of the meanings of $D^1$ or $D^2$ or is a group of the formula (7)

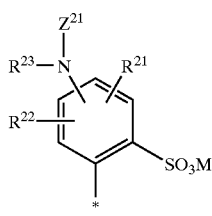
(7)

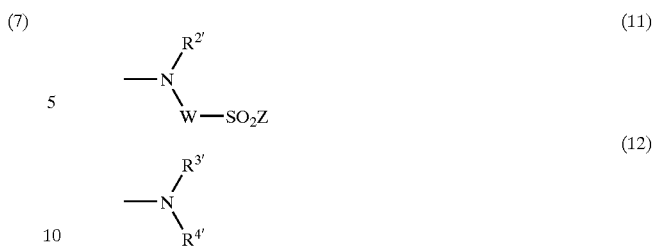
(11)

(12)

wherein

- $R^{21}$ and $R^{22}$ independently have one of the meanings of $R^2$ and $R^3$;
- $R^{23}$ is hydrogen, $(C_1-C_4)$-alkyl, unsubstituted or $(C_1-C_4)$-alkyl-, $(C_1-C_4)$-alkoxy-, sulfo-, halogen- or carboxyl-substituted phenyl; and
- $Z^{21}$ is a fiber-reactive heterocyclic radical, and
- n is 1 or 2; and
- Y is hydroxyl or amino which is unsubstituted or substituted by $(C_1-C_4)$-alkyl or aryl;

at least one of $D^1$ and $D^2$ is a group of the formula (1);

when A is a group of the formula (4), $R^1$ is aryl or substituted aryl; and the reactive dye of the formula (I) contains at least one $-SO_2-Z$ group.

2. The mixture as claimed in claim 1, wherein the reactive heterocyclic radical $Z^{21}$ is a group of the formula (8) or (9) or (10)

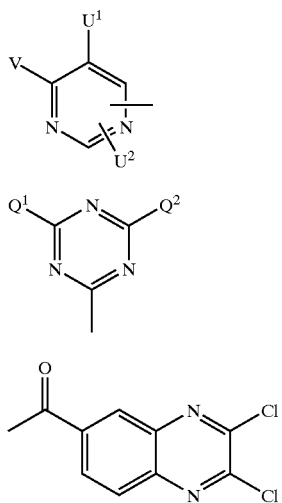

(8)

(9)

(10)

wherein

- V is fluorine or chlorine;
- $U^1$ and $U^2$ are independently fluorine, chlorine or hydrogen; and
- $Q^1$ and $Q^2$ are independently chlorine, fluorine, cyanamido, hydroxyl, $(C^1-C_6)$-alkoxy, phenoxy, sulfophenoxy, mercapto, $(C_1-C_6)$-alkylmercapto, pyridino, carboxypyridino, carbamoylpyridino or a group of the formula (11) or (12)

wherein

- $R^{2'}$ is hydrogen or $(C_1-C_6)$-alkyl, sulfo-$(C_1-C_6)$-alkyl, or phenyl which is unsubstituted or substituted by $(C_1-C_4)$-alkyl, $(C_1-C_4)$-alkoxy, sulfo, halogen, carboxyl, acetamido or ureido;
- $R^{3'}$ and $R^{4'}$ independently have one of the meanings of $R^{2'}$, or combine to form a cyclic ring system of the formula $-(CH_2)_j-$, where j is 4 or 5, or alternatively $-(CH_2)_2-E-(CH_2)_2-$, where E is oxygen, sulfur, sulfo, $-NR^{5'}-$, where $R^{5'}=(C_1-C_6)$-alkyl, or are each a group of the formula (13)

(13)

wherein

- $R^{24}$, $R^{25}$ and $R^{26}$ are independently each $(C_1-C_4)$-alkyl or $(C_1-C_4)$-hydroxyalkyl; and
- B— is the equivalent of an anion;
- W is phenylene which is unsubstituted or substituted by 1 or 2 substituents, wherein the substituents are $(C_1-C_4)$-alkyl, $(C_1-C_4)$-alkoxy, carboxyl, sulfo, chlorine, bromine, or is $(C_1-C_4)$-alkylene-arylene or $(C_2-C_6)$-alkylene, which is optionally interrupted by oxygen, sulfur, sulfo, amino, carbonyl, carboxamido, or is phenylene-CONH-phenylene, which is unsubstituted or substituted by $(C_1-C_4)$-alkyl, $(C_1-C_4)$-alkoxy, hydroxyl, sulfo, carboxyl, amido, ureido or halogen, or is naphthylene, which is unsubstituted or substituted by one or two sulfo groups;
- Z is as defined above and
- the substituents $R^1$ to $R^5$, $R^8$ to $R^{11}$ and $R^{23}$ are each hydrogen, $R^6$, $R^7$, $R^{12}$, $R^{13}$, $R^{21}$ and $R^{22}$ are each hydrogen or sulfo and $R^{24}$, $R^{25}$ and $R^{26}$ are each methyl.

3. The mixture as claimed in claim 1, wherein Z is vinyl, β-chloroethyl or β-sulfatoethyl.

4. The mixture as claimed in claim 2, wherein Z is vinyl, β-chloroethyl or β-sulfatoethyl.

5. The mixture as claimed in claim 1, wherein $D^3$ in the formula (II) is 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 6-(β-sulfatoethylsulfonyl)-1-sulfonaphth-2-yl, 3-vinylsulfonylphenyl, 4-vinylsulfonylphenyl, 4-(3-(2-sulfatoethylsulfonyl)- phenylcarbamoyl)-phenyl, 4-(4-(2-sulfatoethylsulfonyl)-phenylcarbamoyl)-phenyl, 3-(3-(2-sulfatoethylsulfonyl)-phenylcarbamoyl)-phenyl, 3-(4-(2-sulfatoethylsulfonyl)-phenylcarbamoyl)-phenyl, 1-sulfo-4-(2,4-difluoro-pyrimidin-6-yl)-amino-2-phenyl or 1-sulfo-4-(4,6-difluoro-pyrimidin-2-yl)-amino-2-phenyl.

6. The mixture as claimed in claim 4, wherein $D^3$ in the formula (II) is 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 6-(β-sulfatoethylsulfonyl)-1-sulfonaphth-2-yl, 3-vinylsulfonylphenyl, 4-vinylsulfonylphenyl, 4-(3-(2-sulfatoethylsulfonyl)-phenylcarbamoyl)-phenyl, 4-(4-(2-sulfatoethylsulfonyl)-phenylcarbamoyl)-phenyl, 3-(3-(2-sulfatoethylsulfonyl)-phenylcarbamoyl)-phenyl, 3-(4-(2-sulfatoethylsulfonyl)-phenylcarbamoyl)-phenyl, 1-sulfo-4-(2,4-difluoro-pyrimidin-6-yl)-amino-2-phenyl or 1-sulfo-4-(4,6-difluoro-pyrimidin-2-yl)-amino-2-phenyl.

7. The mixture as claimed in claim 1, comprising at least one dye of the Formula (Ia)

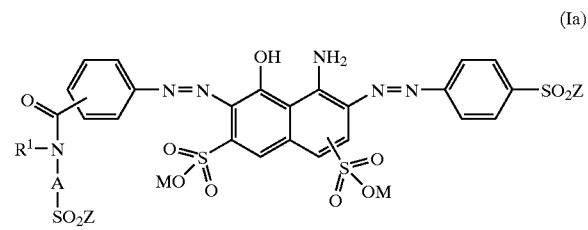
(Ia)

and at least one dye of the Formula (IIa)

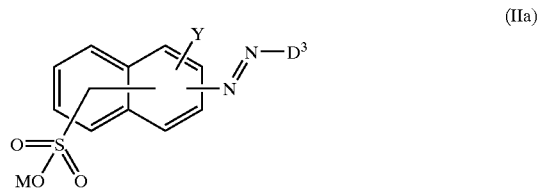
(IIa)

where M, A, $R^1$, Z, $D^3$ and Y are each as defined in claim 1.

8. The reactive dye mixture as claimed in claim 7, wherein A in the formula (Ia) is phenylene, Z is vinyl or β-sulfatoethyl and Y in the formula (IIa) is hydroxyl or amino.

9. The reactive dye mixture as claimed in claim 1, comprising one or more dyes of the formula (I) in a fraction of 30 to 95% by weight and one or more dyes of the formula (II) in a fraction of 5 to 70% by weight.

10. The reactive dye mixture as claimed in claim 1, further comprising one or more monoazo dyes of the formula (14) and/or one or more monoazo dyes of the formula (15) each at 0.5 to 6% by weight

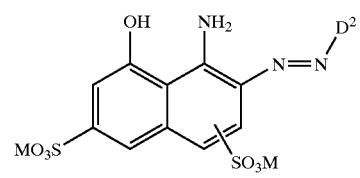
(14)

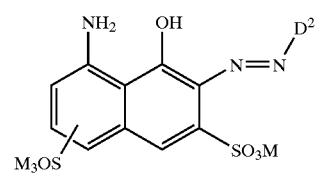
(15)

where $D^2$ and M are each as defined in claim 12.

11. A process for producing dye mixtures as claimed in claim 1, for the case where $D^1$ and $D^3$ in the formulae (I) and (II) are the same, which comprises diazotizing an amine of the formula (16)

$$D^1-NH_2 \quad (16),$$

where $D^1$ is as defined in claim 12, and then reacting the resulting diazonium compound with an aqueous solution or suspension of a monoazo dye conforming to the general formula (14) and a compound conforming to the general formula (17)

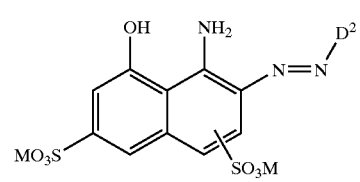
(14)

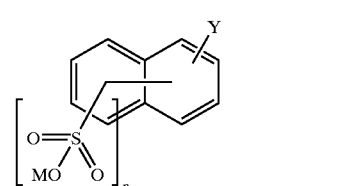
(17)

where M, Y and $D^2$ are each as defined in claim 12.

12. A process for dying a hydroxyl- and/or carboxamido-containing fiber material which comprises contacting the dye mixture as claimed in claim 1 with the material.

13. The dye mixture as claimed in claim 2, wherein B is hydrogensulfate, sulfate, fluoride, chloride, bromide, dihydrogenphosphate, hydrogenphosphate, phosphate, hydroxide or acetate.

14. The reactive dye mixture as claimed in claim 1, wherein the mixture comprises 1 or 2 dyes of the formula (I); and 1 or 2 dyes of the formula (II).

15. The reactive dye mixture as claimed in claim 1, wherein

M is hydrogen or sodium, k is 2 or 3, $R^1-R^5$, $R^8-R^{11}$ and $R^{21}$ are hydrogen, $R^6$, $R^7$, $R^{12}$, $R^{13}$, $R^{22}$ and $R^{23}$ independently are H or sulfo, and $B^-$ is sulfate or chloride.

16. The reactive dye mixture as claimed in claim 2, wherein $R^{24}-R^{26}$ independently are or ethyl.

17. A process for producing the dye mixture as claimed in claim 1 which comprises mixing the dye of the formula (I) and the dye of the formula (II) with each other in the required proportions either mechanically in solid form or in the form of aqueous solutions.

18. A process for producing the dye mixture as claimed in claim 10 which comprises mixing the dye of the formula (I), the dye of the formula (II) and one or more of the monoazo dyes of the formula (14) and the formula (15) with each other in the required proportions either mechanically in solid form or in the form of aqueous solutions.

* * * * *

UNITED STATES PATENT AND TRADEMARK OFFICE
CERTIFICATE OF CORRECTION

PATENT NO. : 6,962,611 B2  
APPLICATION NO. : 10/478124  
DATED : November 8, 2005  
INVENTOR(S) : Joachim Elchhorn Page 1 of 1

It is certified that error appears in the above-identified patent and that said Letters Patent is hereby corrected as shown below:

Column 50, line 17, "where $D^2$ and M are each as defined in claim 12." should read -- where $D^2$ and M are each as defined in claim 1. --

Column 50, line 25, "where $D^1$ is as defined in claim 12, and then reacting the" should read -- where $D^1$ is as defined in claim 1, and then reacting the --

Column 50, line 46, "where M, Y and $D^2$ are each as defined in claim 12." should read -- where M, Y and $D^2$ are each as defined in claim 1. --

Column 50, line 67, "wherein $R^{24}$-$R^{26}$ independently are or ethyl." should read -- wherein $R^{24}$-$R^{26}$ independently are methyl or ethyl. --

Signed and Sealed this

Fourteenth Day of November, 2006

JON W. DUDAS  
*Director of the United States Patent and Trademark Office*